(12) United States Patent
Vecera et al.

(10) Patent No.: US 8,046,195 B2
(45) Date of Patent: Oct. 25, 2011

(54) PERFORMANCE TESTING OF ENTERPRISE SERVICE BUS (75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 380 days.

(21) Appl. No.: 12/198,828

(22) Filed: Aug. 26, 2008

(65) Prior Publication Data
US 2010/0057403 A1 Mar. 4, 2010

(51) Int. Cl.
*G06F 11/30* (2006.01)
(52) U.S. Cl. ........................................ 702/186; 702/187
(58) Field of Classification Search ................. 702/186, 702/187
See application file for complete search history.

(56) References Cited

U.S. PATENT DOCUMENTS

| | | | | |
|---|---|---|---|---|
| 6,341,260 | B2 * | 1/2002 | Klein et al. | 702/186 |
| 7,120,901 | B2 * | 10/2006 | Ferri et al. | 717/128 |
| 2004/0078780 | A1 * | 4/2004 | Dutt et al. | 717/106 |
| 2005/0039172 | A1 * | 2/2005 | Rees et al. | 717/130 |
| 2006/0036426 | A1 * | 2/2006 | Barr et al. | 703/22 |

OTHER PUBLICATIONS

Sullivan, John, SearchNetworking.com Definitions, "client/server", Nov. 3, 2010.*

* cited by examiner

*Primary Examiner* — Jonathan Teixeira Moffat
*Assistant Examiner* — Timothy H Hwang
(74) *Attorney, Agent, or Firm* — Lowenstein Sandler PC (57) ABSTRACT Performance of an Enterprise Service Bus (ESB) is measured using a service deployed on a server. A client runs a compiler to add an aspect to an archive that provides a service when deployed to the server. The aspect causes the server to timestamp marked messages. The archive with the added aspect, which is the aspectized archive, is deployed to the server. The client measures the performance of the service deployed to the server by using timestamps of the marked messages returned from the server.

14 Claims, 5 Drawing Sheets

PERFORMANCE TESTING OF ENTERPRISE SERVICE BUS

TECHNICAL FIELD

Embodiments of the present invention relate to development of service oriented architecture (SOA), and more specifically, to applying aspect oriented programming (AOP) to testing the performance of the Enterprise Service Bus (ESB).

BACKGROUND

The Service Oriented Architecture (SOA) is a popular architectural paradigm for the development of software applications. For example, Web services provide the SOA to other applications via industry standard network, interfaces and protocols. The SOA is based on loosely-coupled and standards-based architectures. It is one approach to distributed computing that allows networked software resources to be leveraged.

An Enterprise Service Bus (ESB) is an underlying infrastructure for the SOA. The ESB implements the abstract design concept of the SOA. The ESB is an event-driven and standards-based messaging engine that provides services for more complex architectures. The ESB provides an infrastructure that links together services and clients to enable distributed applications and processes. The ESB allows systems to interact through standard transports, such as file transfer protocol (FTP) and hypertext transfer protocol (HTTP), and to provide SOA-based applications. The ESB provides the capabilities of message handling, filtering, data transformation, content-based routing, and message repositories. The ESB provides a service to a client using a service deployed on an ESB server at runtime. The client receives the service from the deployed service through the exchange of messages with the ESB server.

Performance of the ESB can be measured by the time it takes for a deployed service to process a message. However, the time measured at the client side is generally not accurate due to an unknown initialization time (e.g., several seconds) for the ESB server to initialize the deployed service. To obtain an accurate measurement of the ESB performance, conventional techniques sometimes modify the source code of a client application to include performance measuring code, or modify the service deployed to the ESB server to perform performance measurements. However, an enterprise may implement many different services that perform various tasks for various client applications. Modifying either the client applications or the services to conduct performance measurements would necessitate extensive re-programming of the existing code, which is time consuming and error prone.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for performance testing of an infrastructure of the Service Oriented Architecture (SOA), for example, the Enterprise Service Bus (ESB). In one embodiment, performance of the ESB is measured using a service deployed on a server. A client runs a compiler to add an aspect to an archive that provides a service when deployed to the server. The archive with the added aspect, which is called the aspectized archive, is deployed to the server. The aspect causes the deployed service on the server to timestamp marked messages. The client measures the performance of the service deployed to the server by using timestamps of the marked messages returned from the server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "measuring", "marking", "modifying", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
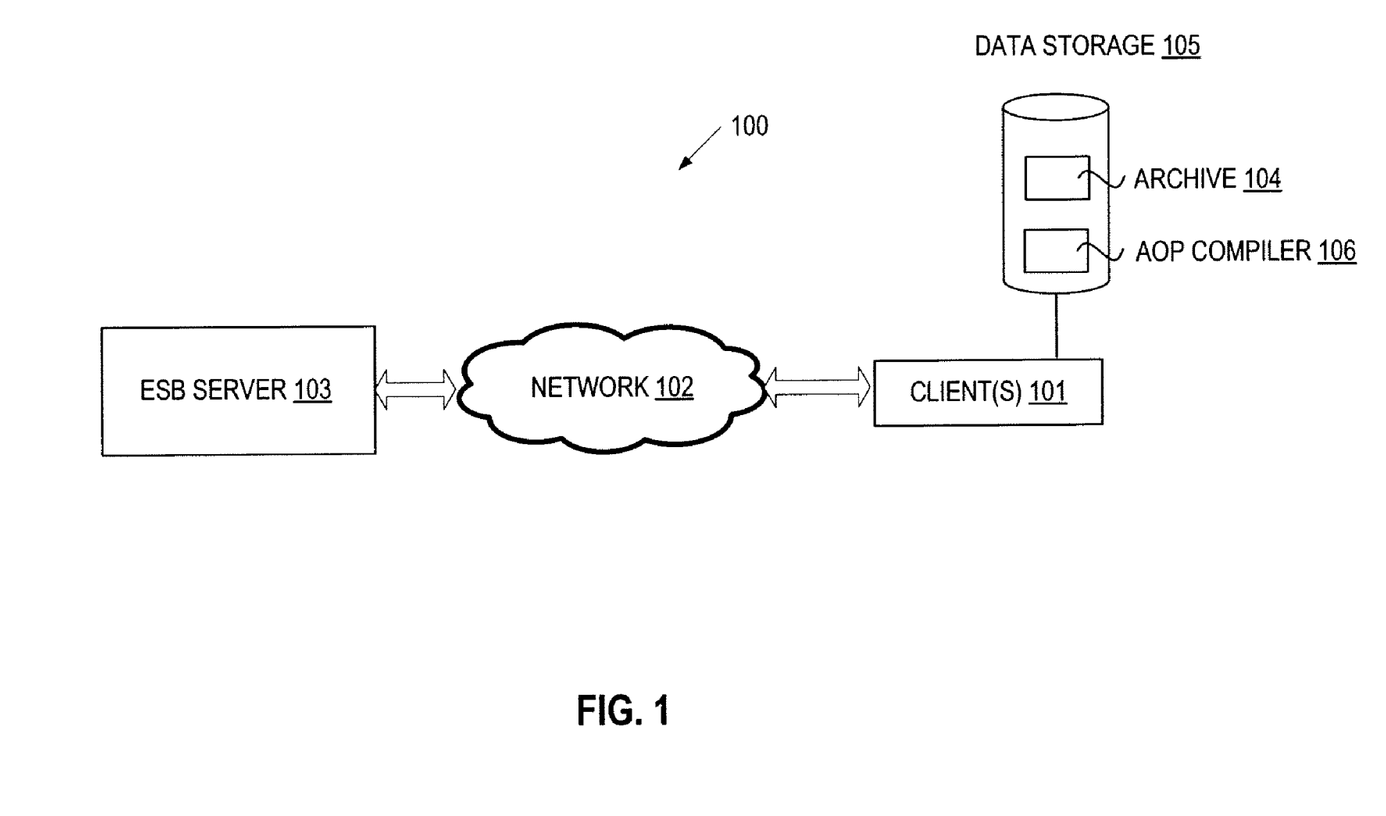
FIG. 1 illustrates an exemplary network architecture in which embodiments of the present invention may operate.

FIG. 1 illustrates an exemplary network architecture 100 in which embodiments of the present invention may operate. The network architecture 100 may include a server (e.g., an ESB server 103) and one or more clients 101 connected via a network 102, which may be a private network (e.g., a local area network (LAN), wide area network (WAN), intranet, etc.) or a public network (e.g., the Internet).

The client 101 may be a computing device such as, for example, a desktop computer, laptop computer, server, cellular phone, personal digital assistant (PDA), etc. In one embodiment, the client 101 is a server of an enterprise, but is a "client" with respect to the ESB server 103. The client 101 interacts with the ESB server 103 by exchanging messages via standard protocols, e.g., FTP and HTTP. The client 101 runs client applications to generate messages that are to be processed by services deployed on the ESB server 103. The client 101 may also include a graphic user interface (GUI) for viewing the results provided from the ESB server 103.

The ESB server 103 executes deployed services (e.g., by calling one or more methods contained in the code that implements the services). The services may be system services including invocation support, routing (static/deterministic routing, content-based routing, rules-based routing, policy-based routing), mediation, messaging, process choreography, service orchestration, complex event processing, security (encryption and signing), reliable delivery, transaction management, management (e.g., monitoring, audit, logging, metering), and user defined services. Through the ESB server 103, users of the client 101 can send requests and receive the information provided by the deployed services.

In accordance with one embodiment of the present invention, the client 101 may measure the performance of a deployed service on the ESB server 103. The performance measurement technique described herein can be applied to any deployed service for any tasks and any purposes. The measurement can be performed without modification to the source code of client applications and the services deployed to the ESB server 103.

In one embodiment, the client 101 runs an aspect oriented programming (AOP) compiler 106 to add an aspect to an archive 104 that provides a service. The aspect causes the ESB server 103, with service deployed thereto, to timestamp marked messages (e.g., messages that are marked as "starting" messages and "ending" messages) for performance measurement. The AOP compiler 106 and the archive 104 may be stored in one or more data storage 105 accessible by the one or more clients 101. The data storage 105 may include one or more storage devices (e.g., the computer-readable medium described above) that are local to the client 101 and/or remote from the client 101. In alternative embodiments, the AOP compiler 106 and the archive 104 may be stored in the main memory of the client 101.

Before further describing the performance measurement, some terminology relating to the AOP is explained as follows. In object-oriented programming (e.g., Java, C++, etc.), functions of a computer program can be divided into interdependent modules. Each module is a component of a program that performs a specific set of related behaviors. Design features that affect multiple different modules are said to be crosscutting concerns. Examples of crosscutting concerns include security, data logging, session management, authentication, performance measurement, etc. Aspect oriented programming (AOP) is a programming approach that was developed to manage crosscutting concerns. In AOP, crosscutting concerns are encapsulated in a number of program modules called aspects. An aspect includes a pointcut and advice. A pointcut is program code that picks out certain join points (e.g., method calls, exception throws, etc.) and values at those points. Advice is code, including one or more operations, which can be executed when a join point is reached. Advice defines crosscutting functionality that transparently forces a modification to program modules or adds additional functionality to program modules.

In one embodiment, the AOP compiler 106 adds an aspect into the archive 104 that includes a service to be deployed to the ESB server 103. The aspect addresses the crosscutting concern of performance measurement. The aspect identifies marked messages in a message sequence that is processed by the deployed service, timestamps the marked messages, and forwards the timestamped messages to a queue for performance measurement. As the timestamps record the time at which the processing of the message sequence starts and ends, the time it takes for the service to process the message sequence can be calculated.

With the added aspect, the archive 104 (which is in Java bytecode) is modified into an aspectized archive (which is also in Java bytecode). The addition of the aspect does not change the services provided by the archive 104, and does not change the source code of client applications run on the client 101. It is not necessary to add the same performance measurement code to multiple different client applications and multiple different services. Rather, a single aspect can be used by the multiple different client applications and the multiple different services.

Although the term "ESB server" is used in the description, a person of ordinary skill in the art will appreciate that the performance measurement described herein can be applied to any server that provides a deployed service to a client that communicates with the server by messages.

Figure 2:
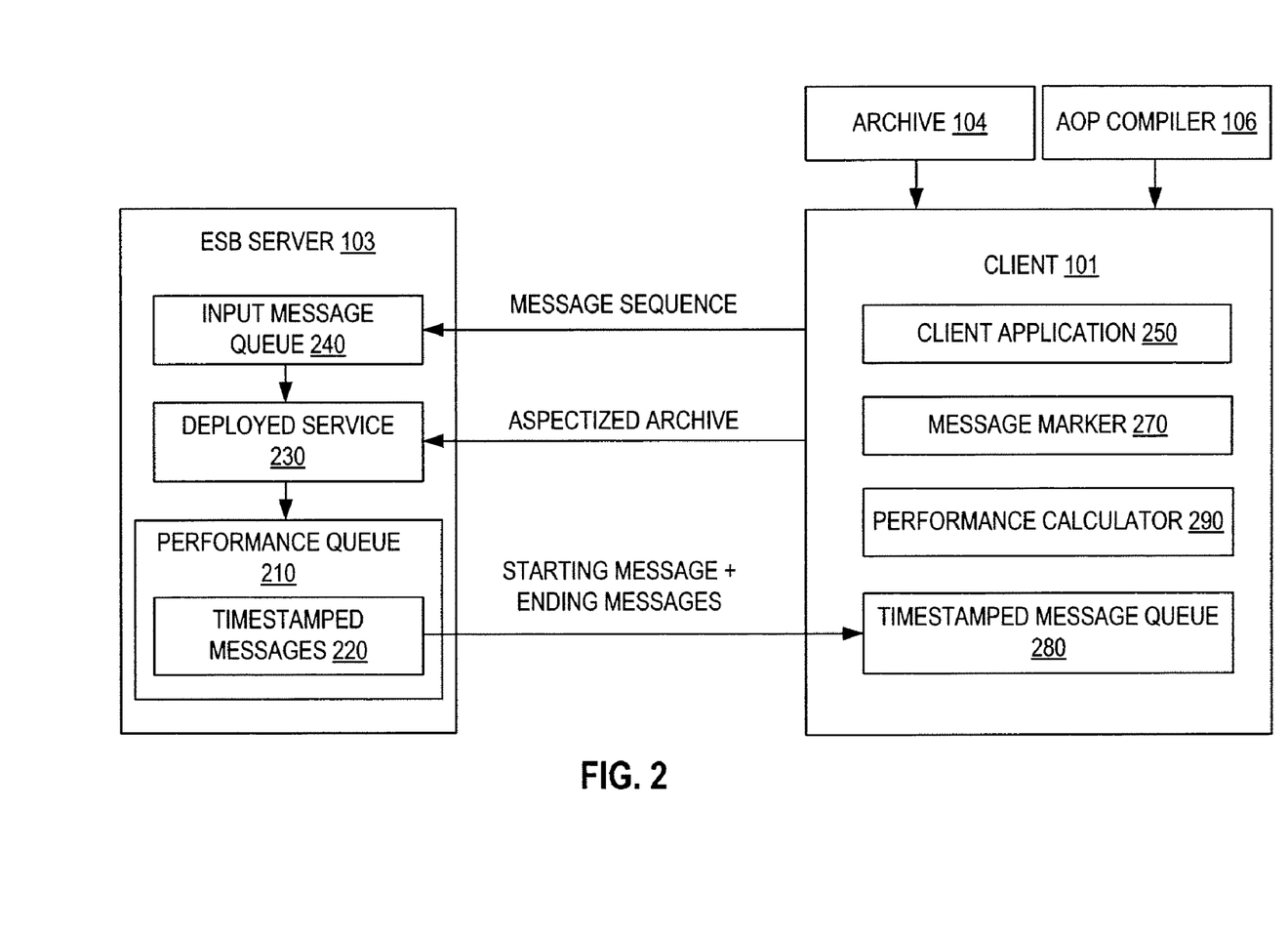
FIG. 2 is a block diagram illustrating one embodiment of an Enterprise Service Bus (ESB) server and a client.

FIG. 2 is a block diagram illustrating components of the ESB server 103 and the client 101 according to one embodiment of the invention. The client 101 runs a client application 250 that generates a message sequence. The client 101 includes a message marker 270 that marks the first message in the message sequence as a starting message and the last message as an ending message. The message sequence is sent to an input message queue 240 on the ESB server 103. The client 101 has access to the AOP compiler 106 and the archive 104. The AOP compiler 106 adds an aspect to the archive 104. In one embodiment, the AOP compiler 106 may perform its function as an Ant task, which automatically builds an aspectized archive using the Extensible Markup Language (XML). The aspectized archive is deployed to the ESB server 103 via a standard protocol (e.g., the HTTP) to provide a deployed service 230. The deployed service 230 "listens" or checks the input message queue 240 and processes the messages in the queue 240.

In one embodiment, the aspect in the deployed service 230 timestamps the starting and ending messages, as they are processed by the deployed service 230, to generate timestamped messages 220. The timestamped messages 220 (e.g., the timestamped starting and ending messages) are sent to a performance queue 210. The timestamped messages 220 in the performance queue 210 are sent back to the client 101 and placed in a timestamped message queue 280 on the client 101. A performance calculator 290 of the client 101 checks the timestamped message queue 280 for the timestamped starting and ending messages. The timestamps in the timestamped messages include a starting time (associated with the starting message) and an ending time (associated with the ending message). The starting and the ending messages indicate when the deployed service 230 on the ESB server 103 starts and ends the processing of the message sequence in input message queue 240. The performance calculator 290 calculates the time it takes for the deployed service 230 on the ESB server 103 to process the messages using the difference between the starting time and the ending time. In one embodiment, the client 101 keeps a message count (e.g., message_count), which is the number of messages in the message sequence that are sent to the ESB server 103. The performance calculator 290 may use the message count to calculate the time it takes for the ESB server 103 to process one message by computing (ending time−starting time)/message_count, or to calculate the processing speed of the ESB server 103 (with the deployed service 230) by computing message_count/(ending time−starting time).

Figure 3:
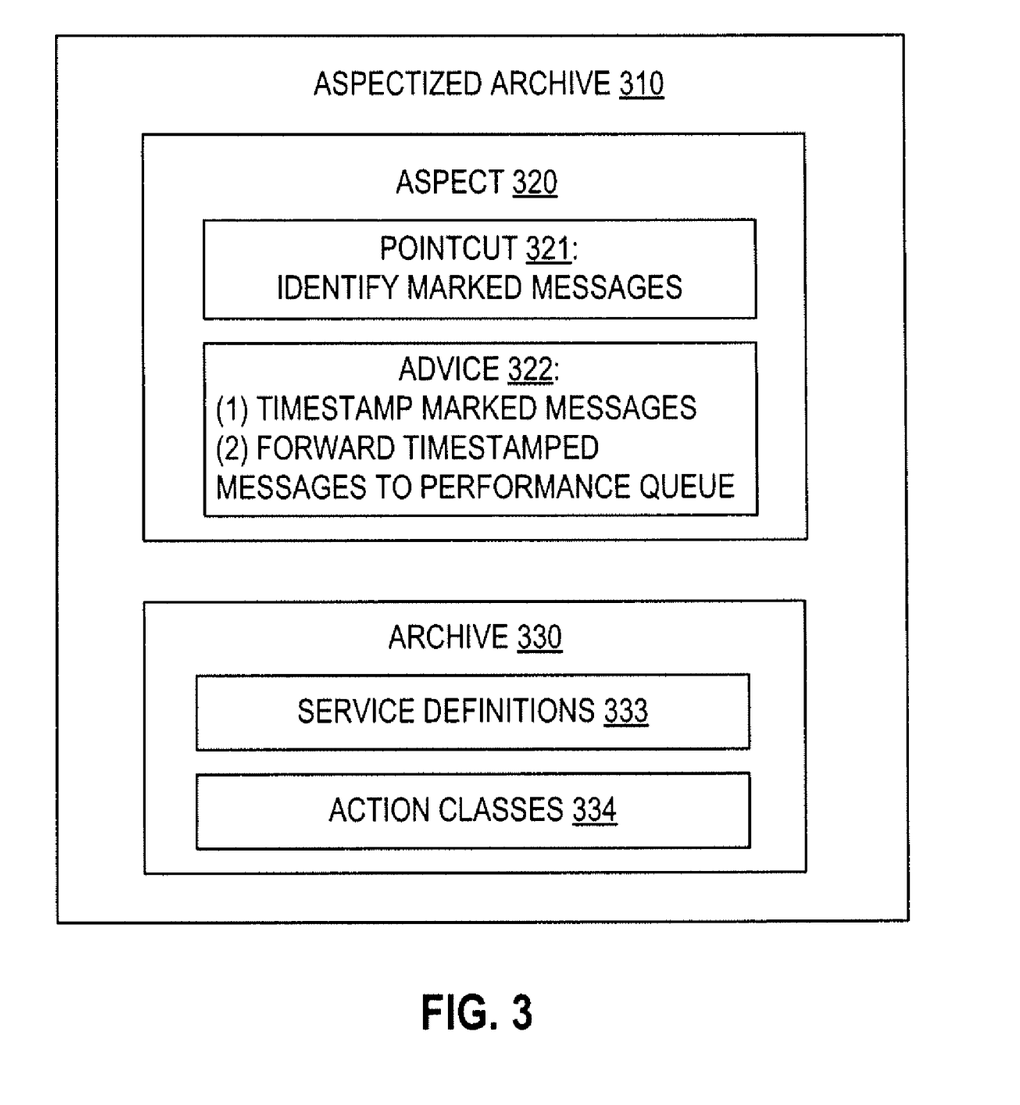
FIG. 3 is a diagram illustrating one embodiment of an aspectized archive deployed to the ESB server.

FIG. 3 is a diagram illustrating an example of an aspectized archive 310 generated by the AOP compiler 106 of FIGS. 1 and 2. The aspectized archive 310 includes an aspect 320 and an archive 330 (such as the archive 104 of FIGS. 1 and 2) that provides a service when deployed to the ESB server 103. Aspect 320 includes a pointcut 321 and advice 322. The pointcut 321 includes code to identify marked messages, including the messages marked as starting messages and the messages marked as ending messages. The operations specified in the advice 322 are triggered when the pointcut 321 is encountered. The advice 322 specifies the operations of timestamping the marked messages to produce timestamped messages, and forwarding the timestamped messages to a performance queue (such as the performance queue 210 of FIG. 2).

The archive 330 includes service definitions 333 and action classes 334. The service provided by the archive 330 is defined by the service definition 333 and is described in the archive 330 as a sequence of actions. The actions are implemented by the action classes 334 (e.g., compiled Java code). When the client 101 runs the AOP compiler 106, it is the action classes 334 that are being aspectized. After the action classes 334 are aspectized, the archive 310 is deployed to the ESB server 103. The ESB server 103 calls methods in the aspectized action classes. In an embodiment where the ESB server 103 runs a Java Virtual Machine, the Java Virtual Machine recognizes the aspect 320 that is added to the action classes 334 and executes the aspect 320.

Figure 4:
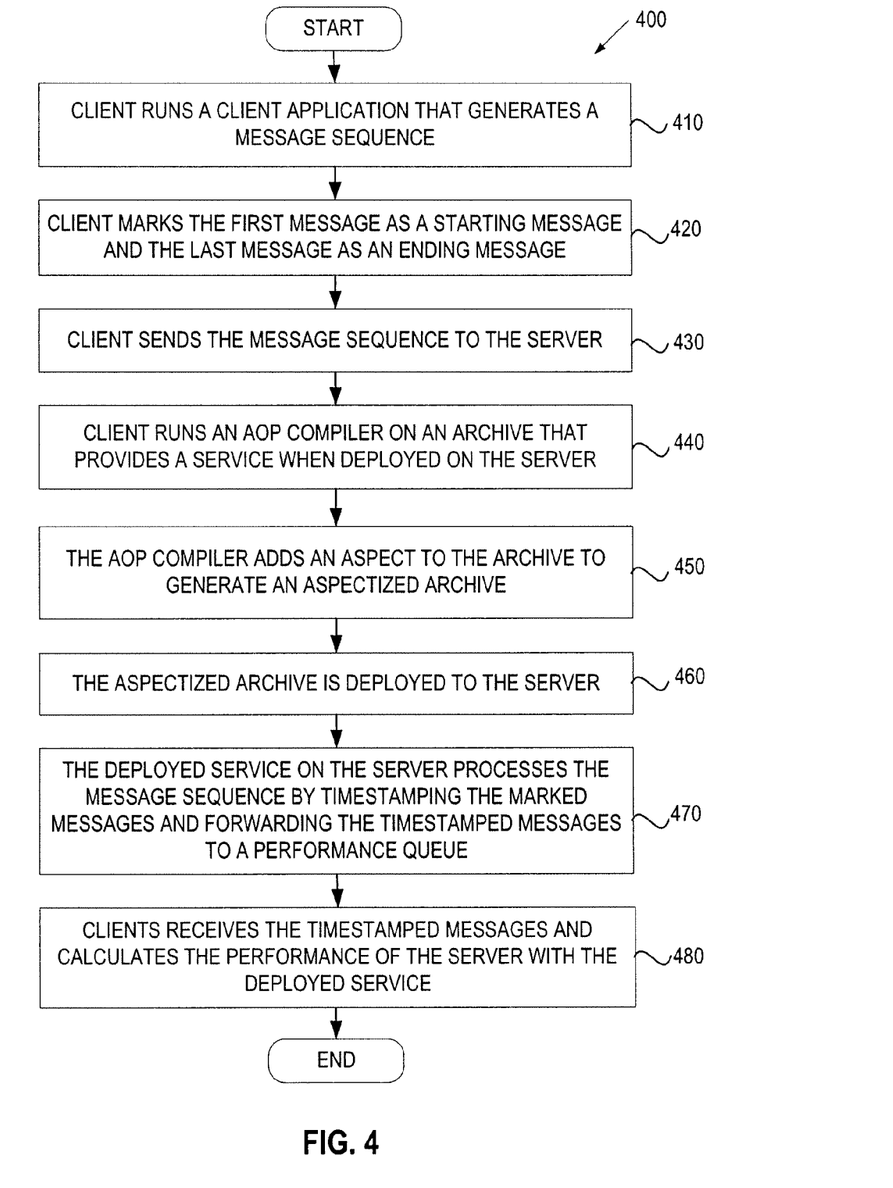
FIG. 4 is a flow diagram illustrating a method for measuring the performance of the ESB server with a deployed service, in accordance with one embodiment of the present invention.

FIG. 4 is a flow diagram illustrating one embodiment of a method 400 for providing aspect services. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the client 101 and the deployed service 230 on the ESB server 103 (FIGS. 1 and 2).

Referring to FIG. 4, at block 410, the client 101 runs a client application that generates a message sequence. At block 420, the client 101 marks the first message and the last message in the message sequence as a starting message and an ending sequence, respectively. At block 430, the client 101 sends the message sequence, including the marked messages, to ESB server 103. At block 440, the client 101 runs the AOP compiler 106 on the archive 104, which provides a service when deployed to ESB server 103. At block 450, the AOP compiler 106 adds an aspect to the archive to generate an aspectized archive. The aspect, when executed by the ESB server 103, timestamps the marked messages to indicate the time at which each marked message is processed by the ESB server 103. The aspect also directs the timestamped messages (e.g., the starting message and the ending message with timestamps) to the performance queue 210 (FIG. 2) on the ESB server 103.

Continuing to block 460, the aspectized archive is deployed to the ESB server 103. At block 470, when the ESB server 103 encounters the first marked message (the starting message), the ESB server 103 timestamps the message and forwards the timestamped starting message to the performance queue 210, as directed by the aspect. The ESB server 103 then processes the other messages in the message sequence. When the ESB server 103 encounters the next marked message (the end message), the ESB server 103 timestamps the message and forwards the timestamped ending message to the performance queue 210, as directed by the aspect. At block 480, the timestamped messages in the performance queue are transmitted to the timestamped message queue 280 (FIG. 2) on the client 101. The client 101 may periodically check the timestamped message queue 280 for timestamped messages, or may be alerted upon the arrival of a timestamped message. Using the timestamps that accompany the messages and the number of messages in the message sequence, the client 101 calculates the performance of the deployed service 230 on the ESB server 103. The method 400 then terminates.

Figure 5:
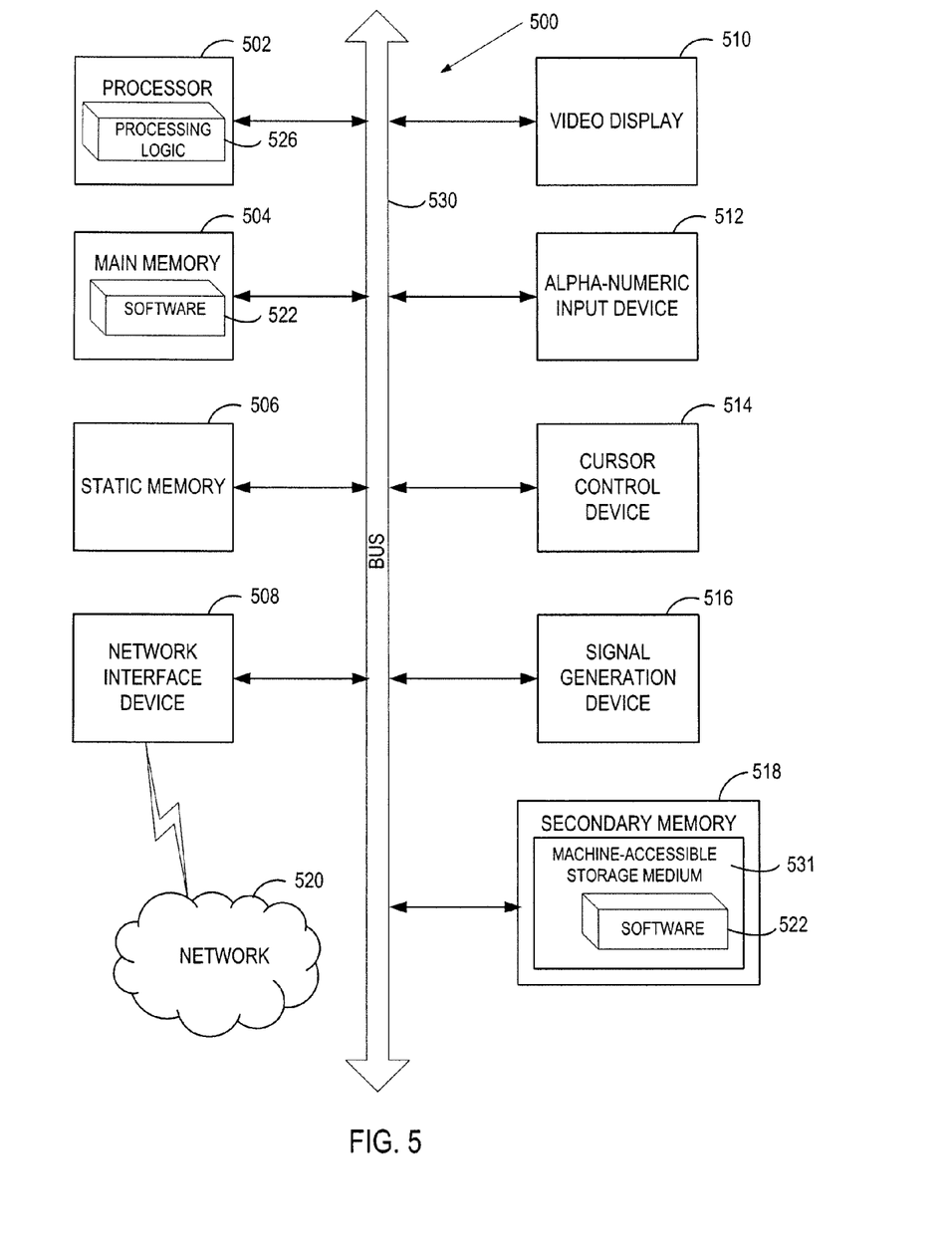
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the AOP compiler 106 and the archive 104 of FIGS. 1 and 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a client computer system programmed to perform the following, comprising:
    marking, by the client computer system, a starting message and an ending message in a message sequence to produce marked messages in the message sequence;
    transmitting, by the client computer system, the message sequence to a server;
    adding, by the client computer system, an aspect to an archive to produce an aspectized archive, the aspect causing the server to timestamp marked messages to produce timestamped messages;
    deploying, by the client computer system, the aspectized archive to the server as a deployed service, which receives the message sequence as input and processes the marked messages according to the aspect; and
    measuring, by the client computer system, performance of the deployed service by calculating a speed of the deployed service for processing one message in the message sequence, wherein the calculating is performed using a difference between timestamps of the timestamped messages returned from the server divided by a number of messages in the message sequence.

2. The method of claim 1, wherein adding an aspect to an archive further comprises:
    modifying the archive in Java bytecode to generate the aspectized archive in the Java bytecode.

3. The method of claim 1, wherein adding an aspect to an archive further comprises:
    adding the aspect to the message sequence to cause the server to forward timestamped messages to a queue on the server for returning to the client computer system.

4. The method of claim 1, wherein the server is an Enterprise Service Bus (ESB) server and the service deployed to the server is defined by actions, the performance being measured without modifying the actions and without adding new actions to the service.

5. The method of claim 1, wherein adding an aspect to an archive further comprises:
    using a compiler at the client computer system to add the aspect to the archive without changing source code of applications run by the client computer system.

6. A system comprising:
    a memory to store an archive, the memory further to store a compiler that adds an aspect to the archive, the aspect to cause the server to timestamp marked messages to produce timestamped messages; and
    a client computer system coupled to the memory, the client computer system to:
        mark a starting message and an ending message in a message sequence to produce the marked messages in the message sequence;
        transmit the message sequence to a server;
        run the compiler to generate an aspectized archive;

deploy the aspectized archive to the server as a deployed service, which receives the message sequence as input and processes the marked messages according to the aspect; and measure performance of the deployed service by calculating a speed of the deployed service for processing one message in the message sequence, wherein the calculating is performed with by using a difference between timestamps of the timestamped messages returned from the server divided by a number of messages in the message sequence.

7. The system of claim 6, wherein the archive is in Java bytecode and is modified to generate the aspectized archive in the Java bytecode.

8. The system of claim 6, wherein the server is an Enterprise Service Bus (ESB) server and the service deployed to the server is defined by actions, the performance being measured without modifying the actions and without adding new actions to the service.

9. The system of claim 6, wherein the client computer system is operative to use a compiler to add the aspect to the archive without changing source code of applications run by the client computer system.

10. A non-transitory computer readable storage medium including instructions that, when executed by a client computer system, cause the client computer system to perform a method comprising:

marking, by the client computer system, a starting message and an ending message in a message sequence to produce marked messages;

transmitting, by the client computer system, the message sequence to a server;

adding, by the client computer system, an aspect to an archive to produce an aspectized archive, the aspect causing the server to timestamp marked messages to produce timestamped messages;

deploying, by the client computer system, the aspectized archive to the server as a deployed service, which receives the message sequence as input and processes the marked messages according to the aspect; and measuring, by the client computer system, performance of the deployed service by calculating a speed of the deployed service for processing one message in the message sequence, wherein the calculating is performed using a difference between timestamps of the timestamped messages returned from the server divided by a number of messages in the message sequence.

11. The non-transitory computer readable storage medium of claim 10, wherein adding an aspect to an archive further comprises:

modifying the archive in Java bytecode to generate the aspectized archive in the Java bytecode.

12. The non-transitory computer readable storage medium of claim 10, wherein adding an aspect to an archive further comprises:

adding the aspect to the message sequence to cause the server to forward timestamped messages to a queue on the server for returning to the client computer system.

13. The non-transitory computer readable storage medium of claim 10, wherein the server is an Enterprise Service Bus (ESB) server and the service deployed to the server is defined by actions, the performance being measured without modifying the actions and without adding new actions to the service.

14. The non-transitory computer readable storage medium of claim 10, wherein adding an aspect to an archive further comprises:

using a compiler at the client computer system to add the aspect to the archive without changing source code of applications run by the client computer system.

\* \* \* \* \*